US008200597B2

(12) United States Patent
Wang et al.

(10) Patent No.: US 8,200,597 B2
(45) Date of Patent: Jun. 12, 2012

(54) SYSTEM AND METHOD FOR CLASSIFIYING TEXT AND MANAGING MEDIA CONTENTS USING SUBTITLES, START TIMES, END TIMES, AND AN ONTOLOGY LIBRARY

(75) Inventors: Fangshan Wang, Shenzhen (CN); Qi Fang, Shenzhen (CN); Yinyan Tan, Shenzhen (CN); Jieping Zhong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 417 days.

(21) Appl. No.: 12/479,066

(22) Filed: Jun. 5, 2009

(65) Prior Publication Data
US 2009/0240650 A1 Sep. 24, 2009

Related U.S. Application Data

(63) Continuation of application No. PCT/CN2007/071133, filed on Nov. 27, 2007.

(30) Foreign Application Priority Data

Dec. 6, 2006 (CN) .......................... 2006 1 0164838

(51) Int. Cl.
*G06F 17/00* (2006.01)
(52) U.S. Cl. ........................................................ 706/45
(58) Field of Classification Search .................... 706/12, 706/45
See application file for complete search history.

(56) References Cited

U.S. PATENT DOCUMENTS

| 2002/0059303 A1 | 5/2002 | Ohmori et al. |
| 2003/0115598 A1 | 6/2003 | Pantoja |
| 2004/0032486 A1 | 2/2004 | Shusman |

FOREIGN PATENT DOCUMENTS

| CN | 1430166 A | 7/2003 |
| CN | 1445684 A | 10/2003 |
| CN | 1851705 A | 10/2006 |
| CN | 1863278 A | 11/2006 |
| CN | 101000617 A | 7/2007 |
| CN | 100449547 C | 1/2009 |
| JP | 10-21217 | 1/1998 |

OTHER PUBLICATIONS

Wu et al., Ontology-based Multi-Classification Learning for Video Concept Detection, 2004, IEEE International Conference on Multimedia and Expo (ICME), pp. 1-4.*

(Continued)

*Primary Examiner* — David Vincent
(74) *Attorney, Agent, or Firm* — Finnegan, Henderson, Farabow, Garrett & Dunner LLP

(57) ABSTRACT

A system and method for managing media contents are disclosed. The system includes: a text classifier, adapted to classify subtitle information according to defined subjects, and obtain content clips of different subjects; and a media content marking unit, adapted to mark the time of playing each content clip of a different subject after contents are classified by the text classifier, obtain the content clips which have specific time information and different subjects, match the content clips with concepts in an ontology library, and mark the content clips through terms defined in the ontology library. Therefore, the media contents are described through standard terms, which is conducive to unification of the content description information and makes it possible to retrieve the media contents.

12 Claims, 5 Drawing Sheets

OTHER PUBLICATIONS

Wilcox et al., Annotation and Segmentation for Multimedia Indexing and Retrieval, 1998, IEEE, pp. 1-8.*

Ayache et al., Using Topic Concepts for Semantic Video Shots Classification, 2006, ICIVR, pp. 1-10.*

International Search Report from P.R. China in International Application No. PCT/CN2007/071133 mailed May 13, 2008.

Written Opinion of the International Searching Authority (translation) dated (mailed) Mar. 13, 2008, issued in related Application No. PCT/CN2007/071133, filed Nov. 27, 2007, Huawei Technologies Co., Ltd.

First Chinese Office Action dated (mailed) Dec. 11, 2007, issued in related Chinese Application No. 200610164838.X Huawei Technologies C., Ltd (7 pages).

* cited by examiner

SYSTEM AND METHOD FOR CLASSIFYING TEXT AND MANAGING MEDIA CONTENTS USING SUBTITLES, START TIMES, END TIMES, AND AN ONTOLOGY LIBRARY

This application is a continuation of international application number PCT/CN2007/071133, filed Nov. 27, 2007, and claims the benefit of priority of Chinese Patent Application No. 200610164838.X, filed with the Chinese Patent Office on Dec. 6, 2006, and entitled "System and Method for Managing Media Contents", the contents of both of which are incorporated herein by reference in their entirety.

FIELD OF THE INVENTION

The invention relates to communication technologies, and in particular, to a system and method for managing media contents.

BACKGROUND OF THE INVENTION

Multimedia information is a main means for people to perceive the nature and recognize the society. With the development of the Internet and popularity of the computer application, the multimedia information on the Internet is growing explosively, which brings new problems to information management and collection.

In the diversified multimedia information, the video and music information is different from ordinary text files, especially with respect to managing the media content information. For the media contents about news and sports events, the contents played at different time are not the same. Therefore, the contents in different time segments in the media need to be marked and managed uniformly. In this way, the desired part can be found conveniently in the case of retrieving the desired contents in numerous media files, and even multiple media contents can be trimmed directly through a computer.

Currently, the foregoing media content management is mostly handled through manual operations, which is time-consuming, effort-consuming, and inefficient.

In some other methods, the media contents are described through text information, and thus managed. A specific method is: An ontology library is defined as concept architecture of correlation between one object and another, and is sharable and understandable by a computer.

However, a perfectly structured ontology library is generally manipulated by the applications such as search engine, knowledge management and e-commerce to improve the efficiency of search or capability of file processing. In some domains, the terminology is limited, and some commonly accepted terms generally exist, which makes it easier to create an ontology library. Therefore, the current ontology library-based applications are primarily applications of domain ontology, for example, in the gene domain or for internal information management of large enterprises. Currently, there is no perfect ontology library, and it is urgent to define a perfect ontology library in the domain of media content management.

Moreover, how to correlate the ontology library with the media content is also a factor to be considered in creating a media library. Currently the identification and recording of media contents are mostly based on image identification or manual identification. The image identification is generally applied in professional fields, for example, capturing the shoot video in a soccer match; and the manual identification means: the media are identified or described manually and then the ontology library is correlated.

Currently, because image identification is inaccurate and slow, few applications use the image identification technology to mark media contents.

Nevertheless, the manual description and marking are subjective and involve huge workload, and is also inefficient in the actual application.

Therefore, it is still urgent now to manage media contents efficiently.

SUMMARY OF THE INVENTION

The embodiments of the disclosure provide a system and method for managing media contents.

The embodiments of the disclosure are fulfilled through the following technical solution:

A system for managing media contents in an embodiment of the disclosure includes:

a text classifier, adapted to: classify subtitle information according to defined subjects, and obtain content clips of different subjects;

a media content marking unit, adapted to: mark specific time of playing each content clip of a different subject after contents are classified by the text classifier, obtain content clips which have specific time information and different subjects, match the content clips with concepts in an ontology library, and mark the content clips through terms defined in the ontology library.

A method for managing media contents in an embodiment of the disclosure includes:

obtaining subtitle information according to a media ID of a media content to be marked;

extracting subtitle content information in the obtained subtitle information, marking the subtitle content information chronologically to form multiple media content time segments, and classifying the multiple media content time segments according to defined subject contents to obtain multiple content clips of different subjects;

marking specific time of playing each content clip in the media according to time information of the media content time segments, and obtaining multiple content clips which have specific time information and different subjects; and matching the content clips with concepts in an ontology library according to the subjects of the content clips which have specific time information and different subjects, and marking the content clips through terms defined in the ontology library.

In the technical solution of the disclosure, the subtitle file corresponding to the media is analyzed, the media contents are divided into different content clips chronologically, the content in each content clip is correlated with the ontology concepts, and the location of the content clip that appears in the media is recorded. In this way, the media contents are described through standard terms, which is conducive to unification of the content description information and makes it possible to retrieve the media contents.

Moreover, through the method and system of the disclosure, the media contents may be retrieved with respect to semantics. In many applications, users expect to retrieve desired contents. If the media contents are described and marked through ontology terms, the contents can be searched out correlatively through semantic inference on the basis of ordinary content retrieval. For example, when a news clip or a multimedia clip is marked "basketball", an inheritance relation may be inferred by correlating the subclass "basketball" of "sports" in the ontology concepts. Therefore, when a user searches for "sports" related program contents, this clip or the whole media corresponding to the clip may be searched out.

That broadens the scope of querying media contents to some extent. Because the location of the clip in the media is recorded, the user may locate the desired content conveniently.

On other occasions, the method and system of the disclosure may be used to edit media contents. For example, when the user expects to locate terrorist attack-related contents among multitudinous multimedia contents, the user can compile an application easily through the system of the disclosure. Therefore, the computer finds the relevant subjects through ontology inference, and edits the contents of the pertinent subjects among multitudinous media contents according to the start time and end time of the contents. In this way, the desired contents are picked out. That is a big help for manual handling to some extent.

DETAILED DESCRIPTION OF THE INVENTION

Figure 1:
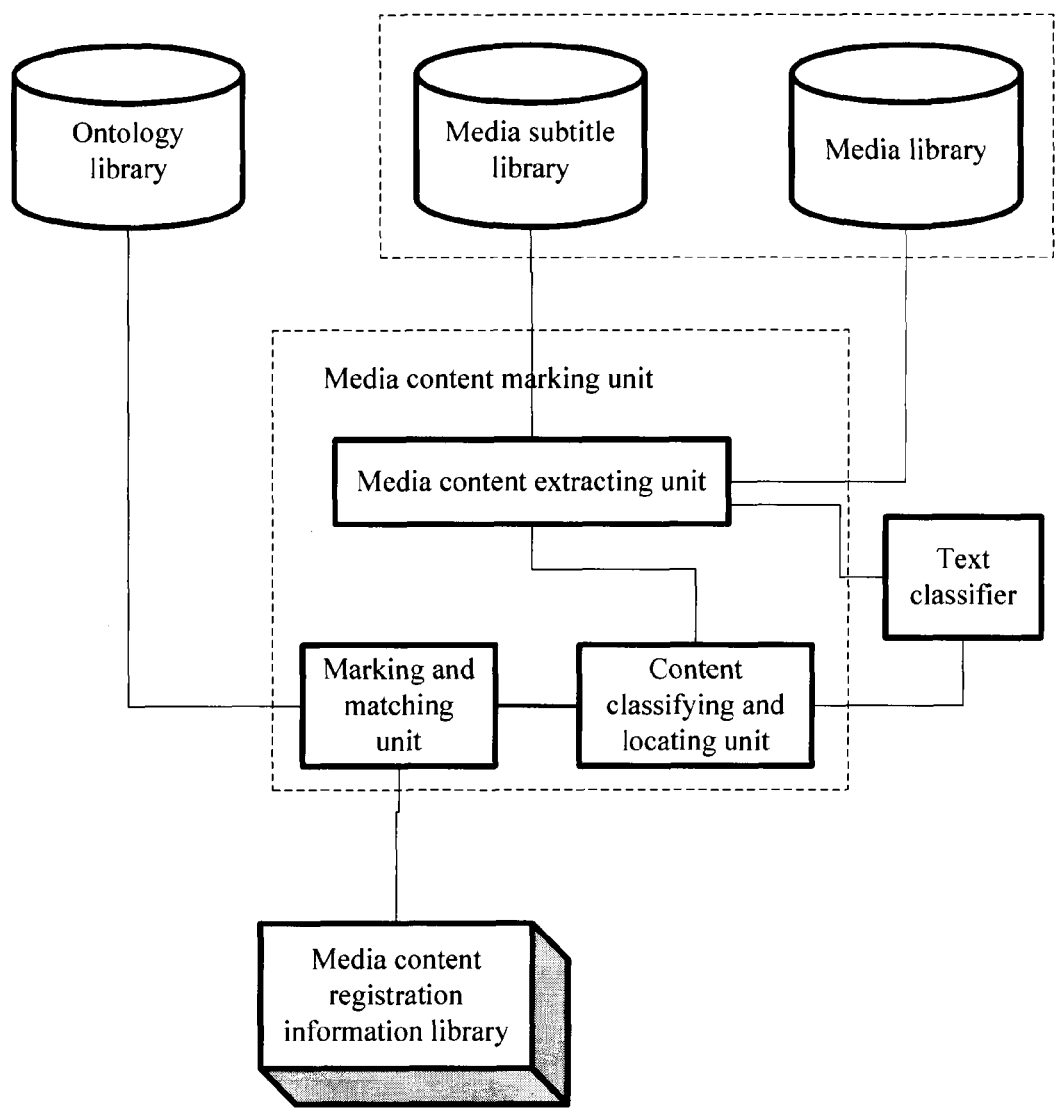
FIG. 1 shows a structure of a system in an embodiment of the disclosure.

A system for managing media contents is provided in an embodiment of the disclosure. As shown in FIG. 1, the system includes: ontology library, media library, media subtitle library attached to the media library, text classifier, media content marking unit, and media content registration information library. The functions of the entities and the relations between the entities are detailed below:

Ontology library: The ontology library defines several concepts including terms, and relations between terms. Such terms describe the specific transactions, and each term has a unique resource ID. The purpose of creating an ontology library is to: obtain and store the knowledge in the media-related domain, provide common understanding of the knowledge in this domain, determine the commonly accepted terms in the domain, and give clear definitions for the interrelation between the terms in the formalized mode at different layers. The languages or standards currently available for describing ontology include: Web Ontology Language (OWL), Knowledge Interchange Format (KIF), Operational Conceptual Modeling Language (OCML), Frame Logic (FLogic), Simple HTML Ontology Extensions (SHOE), Ontology Exchange Language (XOL), Ontology Inference Layer/Ontology Interchange Language (OIL), DARPA Agent Markup Language (DAML), and Resource Description Framework (RDF) and its RDF Schema (an RDF extension).

Media library: The media library stores specific media contents such as video and audio contents. Each medium has a unique ID. The media ID may be a filename of the media (no duplicate filename is allowed), for example, "2006-9-27 News Broadcast.wmv"; or an index specially allocated to the media, for example, "4512358"; or any other number, text, letter symbol sequence, Uniform Resource Locator (URL) or Uniform Resource Identifier (URI) that can identify the media uniquely.

Media subtitle library: The media subtitle library records the subtitle information corresponding to a media content in the media library and is attached to the media. Currently, subtitle files are classified into embedded subtitle files and external subtitle files. An embedded subtitle file is integrated into a media file, and is not modifiable or editable. An external subtitle file may need an additional independent file, which records the subtitles such as voices which appear chronologically. The external subtitle files of video include but are not limited to these file formats: .txt, .srt, sub, .ssa, and .smi. The subtitle information includes not only the subtitle text information, namely, subtitle content information, but also the time code information which indicates the presence time of the subtitle, and the media ID information corresponding to the subtitle file. Generally, the subtitle filename is consistent with the media content filename, except the suffix. On this basis, the correspondence between the two files can be determined.

The media library may also be put together with the media subtitle library, and the media may be put together with the media subtitle file.

Media content marking unit: The media content marking unit is adapted to: mark the time of playing each content clip of a different subject after contents are classified by the text classifier (whose functions are described below), obtain multiple content clips which have specific time information and different subjects, use the terms in the ontology library to mark each content clip which has specific playing time and a different subject, and correlate the content clips with the contents in the ontology library.

The media content marking unit includes three subunits:

a media content extracting unit, adapted to: obtain the media ID of the media content to be marked from the media library, obtain the corresponding subtitle information from the media subtitle library according to the media ID, identify the subtitle content information in the subtitle information, and mark the subtitle content information chronologically to form multiple subtitle content time segments, namely, media content time segments;

a content classifying and locating unit, adapted to: mark the specific time of playing the content clips of different subjects after the contents are classified by the text classifier, namely, mark the start time and end time of each content clip to obtain multiple content clips which have specific time information and different subjects; and a marking and matching unit, adapted to: match the information classified chronologically by the content classifying and locating unit with the concepts in the ontology library, mark a content clip through a term defined in the ontology library, and generate content marking information which includes but is not limited to: media ID corresponding to the clip, ontology concept ID corresponding to the content clip, and description information about the start time and end time of the clip, and so on.

The features of the media content marking unit in this embodiment are also applicable to other embodiments of the disclosure.

Text classifier: The text classifier is adapted to classify the subtitle content information in the independent subtitle information obtained by the media content extracting unit according to defined subject contents. Generally, the text classifier contains several preset subject words or subject statements, and logics and algorithms for identifying the subject to which a text content belongs. The input of the text classifier is information about multiple independent texts, and the output of the text classifier is classification of the text information based on subjects. After classification, multiple content clips of different subjects are obtained.

Media content registration information library: This library is adapted to record the content clips marked by the marking and matching unit.

Figure 2:
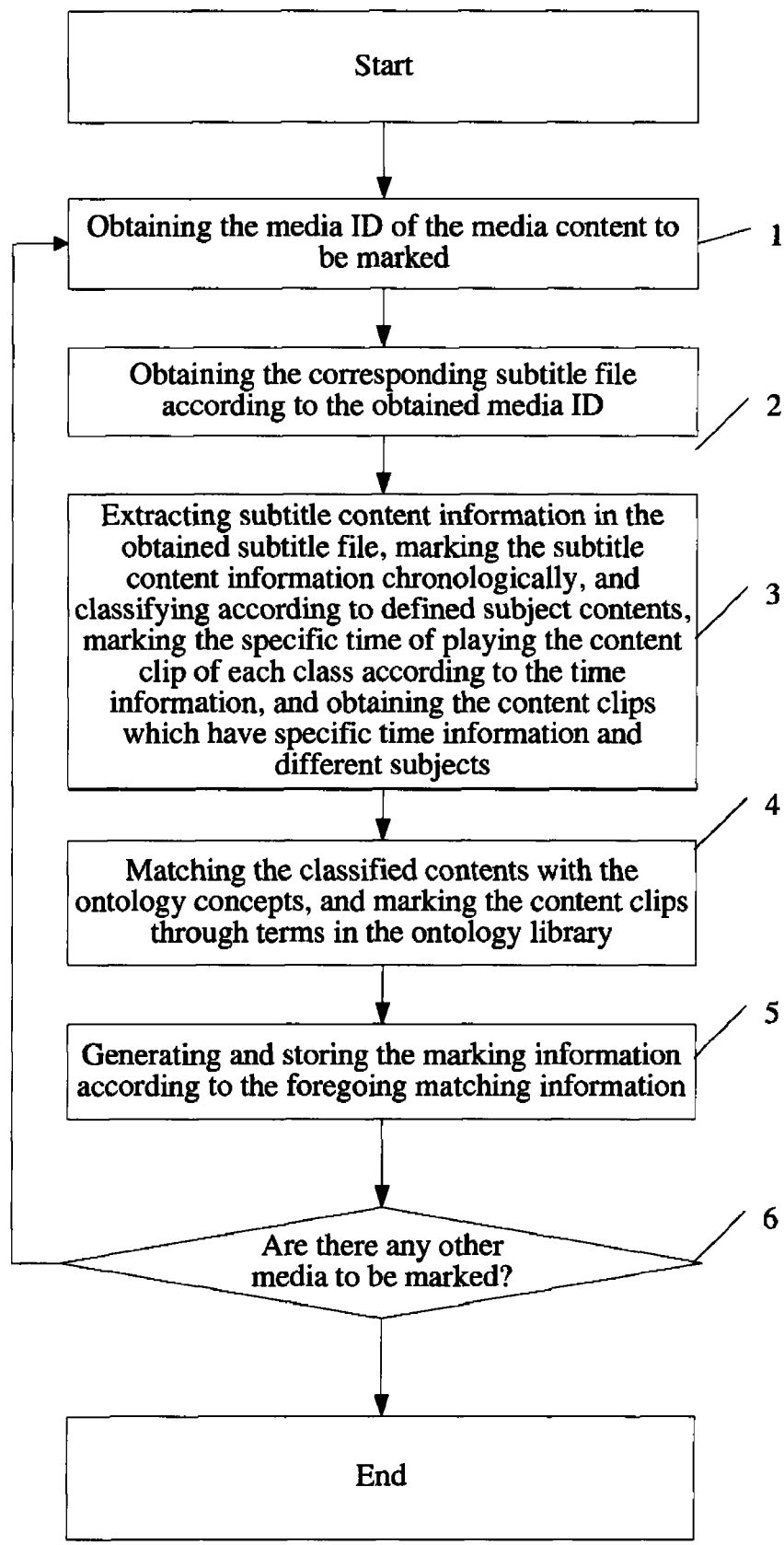
FIG. 2 is a flowchart of a method in an embodiment of the disclosure.

A method for managing media contents is also provided in an embodiment of the disclosure. As shown in FIG. 2, the method includes the following steps:

Step 1: Obtaining the media ID of the media content to be marked.

In a given media library, at least one media file is stored. The media content extracting unit obtains the media ID of the media content to be marked from the media library. The media ID may be a filename of a media file, or an index created specially for the media file.

Step 2: Obtaining the corresponding subtitle file according to the obtained media ID.

The subtitle file provides text description for the dialog in each media, or for other voices or explanations. One media ID may correspond to one subtitle file uniquely.

Currently, subtitle files are classified into embedded subtitle files and external subtitle files. An embedded subtitle file is integrated into a media file, and is not modifiable or editable. An external subtitle file may need an additional independent file, which records the subtitles such as voices which appear chronologically. The external subtitle files include but are not limited to these file formats: .txt, .srt, .sub, .ssa, and smi. The subtitle in the subtitle file of such file formats includes at least: subtitle content information, time code information which indicates the start time and end time of presence of the subtitle, and the media ID information corresponding to the subtitle file. The time information appears as a time code of the standard format in the subtitle, and the format is XX:XX:XX, where the first XX represents hour, the second XX represents minute, and the last XX represents second.

Step 3: Extracting the subtitle content in the obtained subtitle file, marking the subtitle content information chronologically to form multiple media content time segments, and classifying the multiple media content time segments according to defined subject contents to obtain multiple content clips of different subjects; marking the time of playing each content clip in the media according to the time information of the media content time segments, and obtaining the content clips which have specific time information and different subjects.

Figure 3:
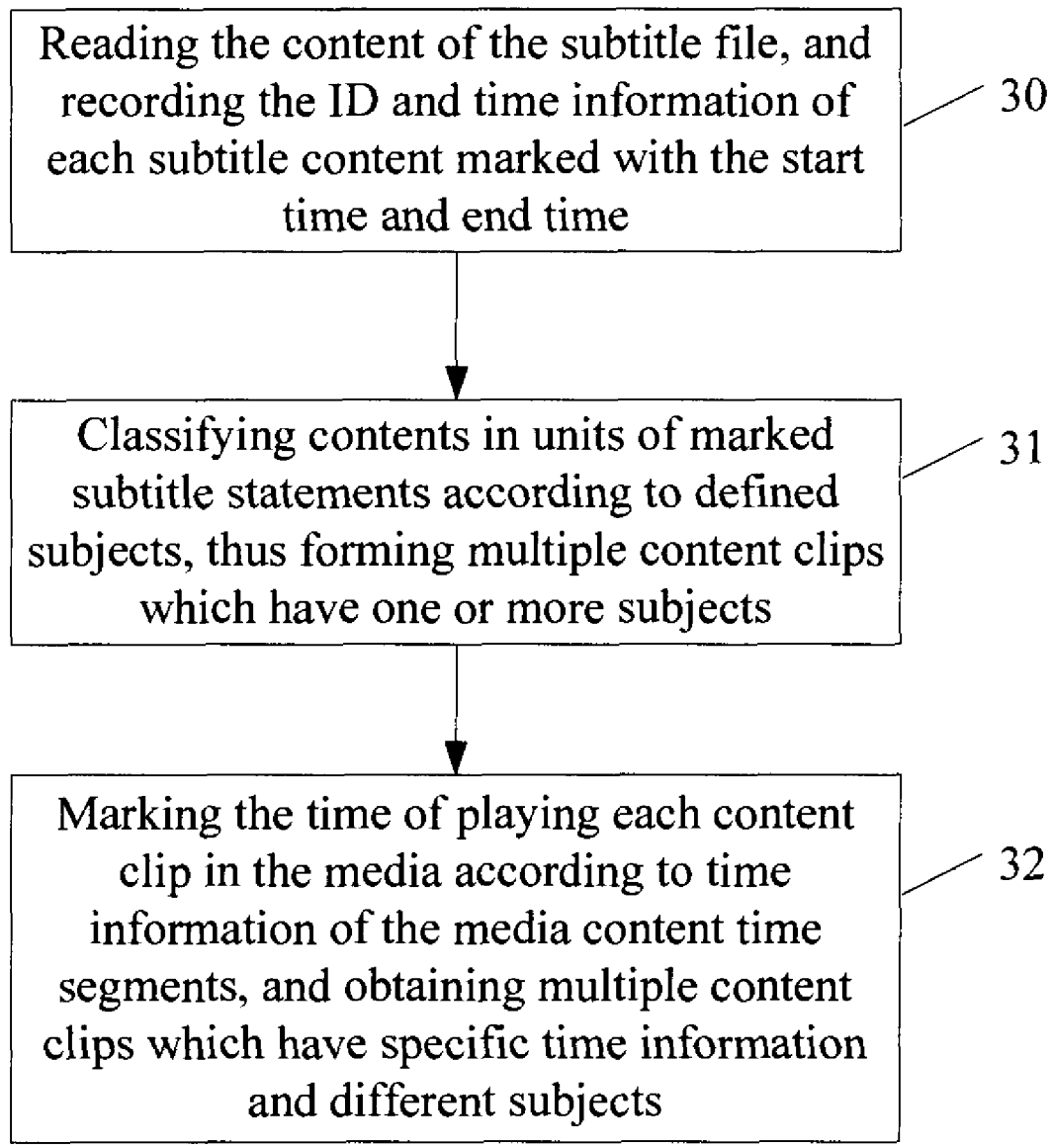
FIG. 3 is a flowchart of clipping and locating contents in an embodiment of the disclosure.

As shown in FIG. 3, this step in an embodiment of the disclosure includes:

Step 30: Reading the content of the subtitle file, and recording the ID and time information of each subtitle content marked with the start time and end time;

identifying a given subtitle file, and extracting all subtitle content information that appears in the subtitle file, and the time code information corresponding to the subtitle content, where the subtitle content information may be a subtitle statement; and recording an ID for each subtitle statement with a time code.

The result of extracting the content is shown in the following instance:

| ID | Subtitle Statement | Time |
|---|---|---|
| 1001 | The life and death of Bin Laden become a focus of concern of people. | 00:25:17-00:25:25 |
| 1002 | The anti-terrorism spokesman of the US proclaims that no evidence proves death of Bin Laden. | 00:25:30-00:25:33 |

-continued

| ID | Subtitle Statement | Time |
|---|---|---|
| 1003 | Currently the international terrorist activities are still rampant. | 00:30:39-00:30:45 |
| 1004 | Now let's look at sports news. | 00:30:45-00:30:50 |
| 1005 | Today is the fourth day of the Chinese Tennis Open. | 00:31:15-00:31:20 |

Each piece of time information includes the start time and end time of presenting the statement during playing of the media, where "-" is preceded by the start time, and followed by the end time.

Each type of subtitle file has a fixed format, a mature subtitle content, and a format extractor. For example, the professional VOBSUB subtitle identification software can extract subtitle information of multiple formats. As for the subtitle of the text format such as .txt, the time and subtitle information is in a fixed format, and the information compliant with the conditions may be extracted through a regular expression. The extraction is based on the conventional art, and is not detailed further.

Step 31: Classifying the contents in units of marked subtitle statements according to the defined subjects, thus forming multiple content clips which represent one or more subjects.

Currently, the conventional art is relatively mature for classifying the information in many ways based on text information. For example, the Term Frequency/Inverse Document Frequency (TF/IDF) becomes a commonly accepted method for information classification and retrieval. Other classification methods include: Bayesian classification algorithm, Rocchio (similarity calculation method), K-nearest neighbor (KNN), and Naïve Bayes. All such information classification methods can classify different text contents input into the classifier according to different subjects. The subjects include the knowledge classes customized manually beforehand and the keyword directory structure learned by the machine in the classification process.

Figure 4:
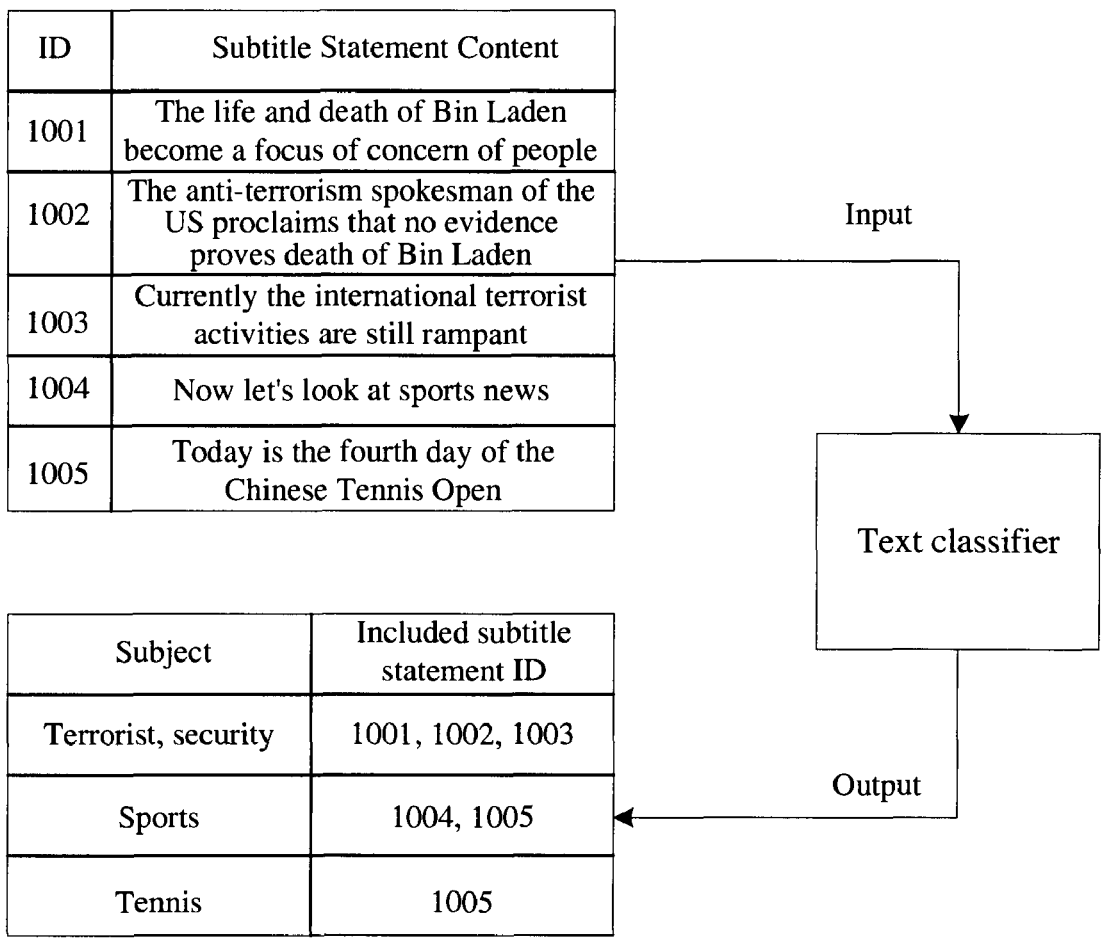
FIG. 4 shows the classification of subtitle contents in an embodiment of the disclosure.
Figure 5:
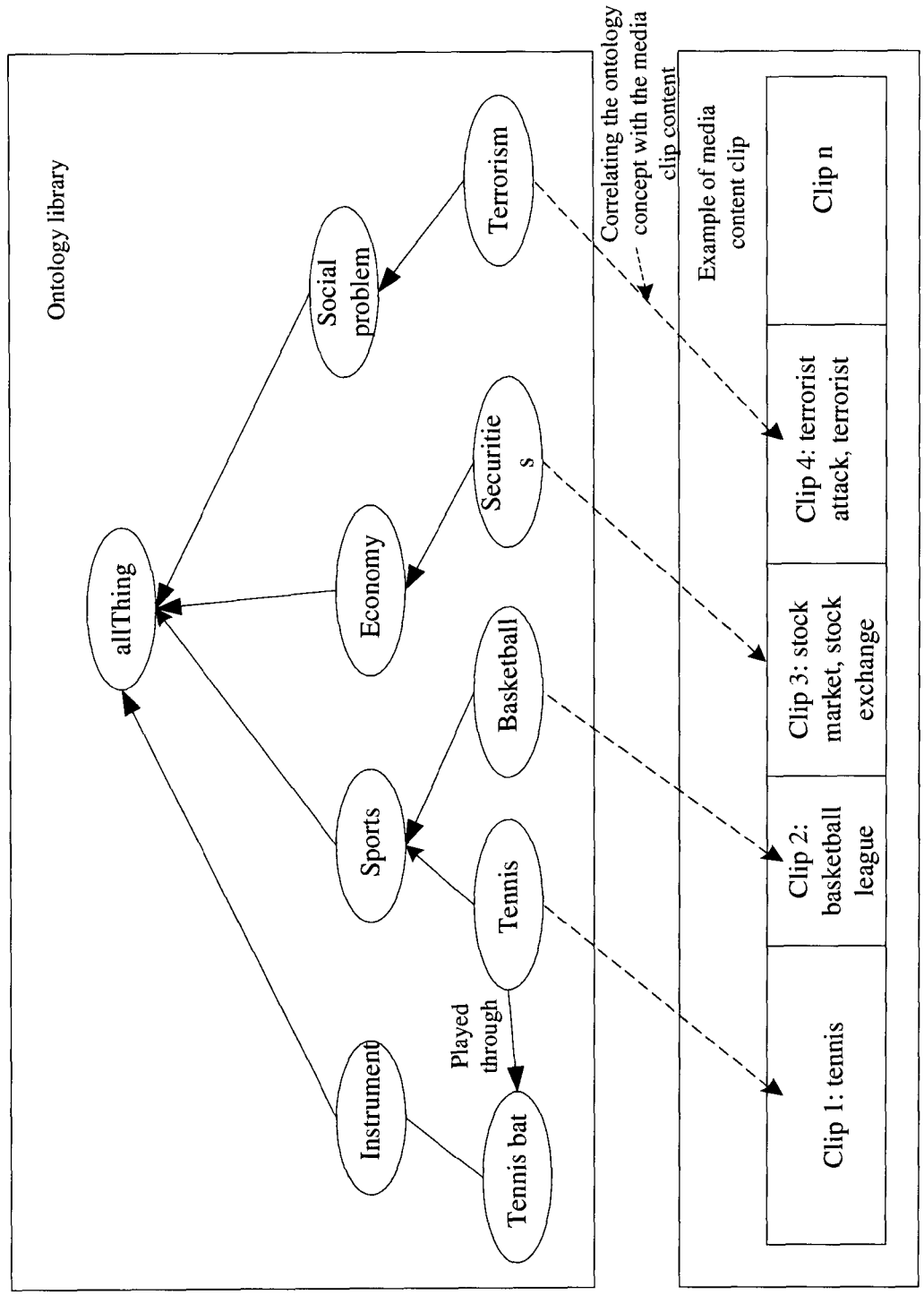
FIG. 5 shows the correlation between a media content and an ontology library in an embodiment of the disclosure.

Classification of the subtitle contents herein uses the content of the whole subtitle file as an object and uses each independently identifiable subtitle statement as a unit. FIG. 4 shows a classification process. The process of classifying the subtitle files is based on the conventional art, while the input data may be generated by the media content extracting unit in the system of the disclosure, and the component for receiving the output data may be a content classifying and locating unit.

After the contents are classified, a complete subtitle file is divided into several pieces of classified information of different subjects, namely, several content clips. Each content clip includes one or more subtitle statements (namely, subjects) which are independently identifiable and have the start time and end time of presence in the media. One clip may intersect or include another clip with respect to time or included subtitle statements. A clip which includes the contents of a subject and uses a subtitle to represent the contents corresponds to a media clip of a time segment of the media. As for the media such as news and sports commentary, the contents reflected by the subtitle are presented by the media and understandable to people.

Step 32: Marking the time of playing each content clip in the media according to time information of the media content time segments, and obtaining multiple content clips which have specific time information and different subjects.

Each content clip may include one or more subjects, and each subject appears at different time. The content clip corresponds to a media clip in the media. The time range of presence of the content clip needs to be marked according to the time of presence of each subject.

The marking method includes: According to a time threshold (which may be preset or determined through an algorithm according to the media), one content clip with multiple subjects whose time interval exceeds the threshold is divided into multiple content clips of the same subject. For example, if a content clip includes three subtitle statements 1001, 1002, 1003, the time threshold is set to 3 minutes, and the start time of subtitle 1003 is over 3 minutes apart from the time segments of the other two subtitles, then the content clip is divided into two content clips which are composed of 1001, 1002 and 1003 and have the same subject.

The method for marking the time segment of playing each content clip in the media includes: determining the statement that appears first in each content clip as a start statement and determining the statement that disappears last in each content clip as an end statement, setting the start time of the start statement of the content clip to be the start time of the content clip played in the media, and setting the end time of the end statement to be the end time of the content clip.

| Content Clip ID | Subject | Start Time | End Time |
|---|---|---|---|
| 101 | Terrorist, security | 00:25:17 | 00:25:33 |
| 102 | Terrorist, security | 00:30:39 | 00:30:45 |
| 103 | Sports | 00:30:45 | 00:31:20 |
| 104 | Tennis | 00:31:15 | 00:31:20 |

Step 4: Matching the classified contents with the ontology concepts, and marking the content clips through terms in the ontology.

After the subtitle contents are classified in the foregoing process, each obtained clip has one or more subjects (which may be keywords or statements) representing the content of the clip. To correlate the content of the clip with a concept in the ontology, it is necessary to match the subject with an ontology concept and find the ontology concept corresponding to the content clip. The matching refers to finding a concept whose meaning is similar to or the same as a subject in the ontology library. The matching may be implemented in many ways. For example, through the traditional fuzzy matching algorithm, the concept most approximate to the matched subject word is found in the ontology; or correction is made according to other subject words of the clip. Finally, one or more matched ontology terms are picked out for identifying the subject content of the clip.

Simple keywords can be matched with the ontology concepts through the traditional fuzzy matching method. An instance of the method is: searching the ontology for the words that include part or all of the desired terms through the "like" function in data query by using the ontology concept as an ordinary term. For example, through the "like" matching method, the concept that matches the word "terror" in the ontology is "terrorism"; if more than one ontology concept matches the word, the most approximate ontology concept is determined by using the ratio of "the number of matched words" to "the total number of words in the concept" as a matching rate. Some other ontology concept matching algorithms such as ontology inference and relevance matching algorithm are more precise and efficient.

For given ontology libraries, given domains, knowledge classes and knowledge libraries, a mapping relation exists between their concepts inherently. The mapping relation reveals the mapping relation between a subject word or a subject statement and a term in the ontology concept, as shown in the following table:

| Index | Subject Word | Ontology URI | Remarks |
|---|---|---|---|
| 1 | Terrorist | http://www.xinhua.com/terns/terrorism | |
| 2 | Sports | http://www.xinhua.com/terns/sports | |

For subjects with a mapping relation, the implementation process includes: selecting the subject word of the content clip; searching for the ontology URI corresponding to the subject word in the mapping table, and using the ontology URI as an ontology concept for marking the content clip. Table 5 shows the correlation between a specific content clip and an ontology library.

Step 5: Generating and storing the marking information according to the foregoing matching information.

The marking information includes recording of each classified content clip. The recorded contents include but are not limited to: media ID to which the content clip belongs, media concept resource ID corresponding to the content clip, start time and end time of the content clip in the media, and so on. The foregoing marking information is a basis for managing the media content.

Step 6: Checking for any other media to be marked.

If no such media exist, the process is ended; if any such media exist, steps 1-5 are repeated.

The foregoing embodiment is a preferred embodiment of the disclosure, where: after the subject (such as "tennis") of the media clip content is found, the subject is matched with a concept in the ontology, and the step of finding a term in the ontology for marking the clip content is omissible.

To sum up, in the embodiments of the disclosure, the subtitle file corresponding to the media is analyzed, the media contents are divided into different content clips chronologically, the content in each content clip is correlated with the ontology concepts, and the location of the content clip that appears in the media is recorded. In this way, the media contents are described through standard terms, which is conducive to unification of the content description information and makes it possible to retrieve the media contents.

It is understandable to those skilled in the art that all or part of the steps in the foregoing embodiments may be performed through hardware instructed by a program. The program may be stored in a computer-readable storage medium such as a ROM/RAM, a magnetic disk and a compact disk. When executed, the program includes the following steps:

Step 1: Obtaining the media ID of the media content to be marked.

In a given media library, at least one media file is stored. The media content extracting unit obtains the media ID of the media content to be marked from the media library. The media ID may be a filename of a media file, or an index created specially for the media file.

Step 2: Obtaining the corresponding subtitle file according to the obtained media ID.

The subtitle file provides text description for the dialog in each media, or for other voices or explanations. One media ID may correspond to one subtitle file uniquely.

Currently, subtitle files are classified into embedded subtitle files and external subtitle files. An embedded subtitle file is integrated into a media file, and is not modifiable or editable. An external subtitle file may need an additional independent file, which records the subtitles such as voices which appear chronologically. The external subtitle files include but are not limited to these file formats: .txt, .srt, .sub, .ssa, and .smi. The subtitle in the subtitle file of such file formats includes at least: subtitle content information, time code information which indicates the start time and end time of presence of the subtitle, and the media ID information corresponding to the subtitle file. The time information appears as a time code of the standard format in the subtitle, and the format is XX:XX:XX, where the first XX represents hour, the second XX represents minute, and the last XX represents second.

Step 3: Extracting the subtitle content in the obtained subtitle file, marking the subtitle content information chronologically to form multiple media content time segments, and classifying the multiple media content time segments according to defined subject contents to obtain multiple content clips of different subjects; marking the time of playing each content clip in the media according to the time information of the media content time segments, and obtaining the content clips which have specific time information and different subjects.

Step 4: Matching the classified contents with the ontology concepts, and marking the content clips through terms in the ontology.

After the subtitle contents are classified in the foregoing process, each obtained clip has one or more subjects (which may be keywords or statements) representing the content of the clip. To correlate the content of the clip with a concept in the ontology, it is necessary to match the subject with an ontology concept, and find the ontology concept corresponding to the content clip. The matching refers to finding a concept whose meaning is similar to or the same as a subject in the ontology library. The matching may be implemented in many ways. For example, through the traditional fuzzy matching algorithm, the concept most approximate to the matched subject word is found in the ontology; or correction is made according to other subject words of the clip. Finally, one or more matched ontology terms are picked out for identifying the subject content of the clip.

Simple keywords can be matched with the ontology concepts through the traditional fuzzy matching method. An instance of the method is: searching the ontology for the words that include part or all of the desired terms through the "like" function in data query by using the ontology concept as an ordinary term. For example, through the "like" matching method, the concept that matches the word "terror" in the ontology is "terrorism"; if more than one ontology concept matches the word, the most approximate ontology concept is determined by using the ratio of "the number of matched words" to "the total number of words in the concept" as a matching rate. Some other ontology concept matching algorithms such as ontology inference and relevance matching algorithm are more precise and efficient.

For given ontology libraries, given domains, knowledge classes and knowledge libraries, a mapping relation exists between their concepts inherently. The mapping relation reveals the mapping relation between a subject word or a subject statement and a term in the ontology concept, as shown in the following table:

| Index | Subject Word | Ontology URI | Remarks |
|---|---|---|---|
| 1 | Terrorist | http://www.xinhua.com/terns/terrorism | |
| 2 | Sports | http://www.xinhua.com/terns/Sports | |

For subjects with a mapping relation, the implementation process includes: selecting the subject word of the content clip; searching for the ontology URI corresponding to the subject word in the mapping table, and using the ontology URI as an ontology concept for marking the content clip. Table 5 shows the correlation between a specific content clip and an ontology library.

Step 5: Generating and storing the marking information according to the foregoing matching information.

The marking information includes recording of each classified content clip. The recorded contents include but are not limited to: media ID to which the content clip belongs, media concept resource ID corresponding to the content clip, start time and end time of the content clip in the media, and so on. The foregoing marking information is a basis for managing the media content.

Step 6: Checking for any other media to be marked.

If no such media exist, the process is ended; if any such media exist, steps 1-5 are repeated.

Although the invention has been described through some preferred embodiments, the invention is not limited to such embodiments. It is apparent that those skilled in the art can make various variations and substitutions to the invention without departing from the spirit and scope of the invention. The invention is intended to cover the variations and substitutions provided that they fall in the scope of protection defined by the claims or their equivalents.

What is claimed is:

1. A system for managing media contents, comprising:
a text classifier, configured to: classify subtitle information of a media content to be marked according to defined subjects, and obtain content clips of different subjects; and
a media content marking unit, configured to: mark start time and end time of each played content clip of a different subject after contents are classified by the text classifier, obtain the content clips which have the start time and the end time information and different subjects, match the content clips with concepts in an ontology library, and mark the content clips through terms defined in the ontology library,
wherein the media content marking unit further comprises:
a media content extracting unit, configured to: obtain the media ID of the media content to be marked, obtain the corresponding subtitle information according to the media ID, identify subtitle content information in the subtitle information, and mark the subtitle content information chronologically to form multiple media content time segments;
a content classifying and locating unit, configured to: mark the start time and the end time of each played content clip of a different subject after the contents are classified by the text classifier according to the start time and end time information of the media content time segments, and obtain multiple content clips which have the start time and end time information and different subjects; and
a marking and matching unit, configured to: match the content clips with the concepts in the ontology library, wherein the concept clips are marked by the content classifying and locating unit with the start time and end time information and have different subjects; and mark the content clips through the terms defined in the ontology library.

2. The system of claim 1, further comprising:
an ontology library, configured to store several concepts which comprise terms commonly accepted in media-related domains and interrelations between the terms;
a media library, configured to store a specific media content which has a media ID; and
a media subtitle library, configured to record the subtitle information which corresponds to the media content in the media library and is attached to media.

3. The system of claim 1, wherein marking information generated in the process of marking the content clips through the terms defined in the ontology library comprises: media ID corresponding to each class of contents, ontology concept ID corresponding to each class of contents, and description information about start time and end time of each class of contents.

4. The system of claim 1, further comprising:
a media content registration information library, configured to record the content clips marked with the terms defined in the ontology library.

5. The system of claim 1, wherein each term in the ontology library has a unique resource ID.

6. The system of claim 2, wherein: the media ID is a filename of the media (no duplicate filename is allowed), or an index specially allocated to the media, or any other number, text, letter symbol sequence, Uniform Resource Locator (URL) or Uniform Resource Identifier (URI) that can identify the media uniquely.

7. The system of claim 2, wherein the subtitle information comprises:
subtitle content information, time code information which indicates time of presence of a subtitle, and/or media ID information corresponding to a subtitle file.

8. A method for managing media contents, comprising:
obtaining subtitle information according to a media ID of a media content to be marked;
extracting subtitle content information in the obtained subtitle information, marking the subtitle content information chronologically to form multiple media content time segments, and classifying the multiple media content time segments according to defined subject contents to obtain multiple content clips of different subjects;
marking start time and end time of each played content clip in media according to time information of the media content time segments, and obtaining multiple content clips which have start and end time information and different subjects;
matching the content clips with concepts in an ontology library according to subjects of the content clips which have the start and end time information and different subjects, and marking the content clips through terms defined in the ontology library;
extracting the subtitle content information in the obtained subtitle information, and recording an ID and time information of each subtitle content marked with the start time and end time;
classifying contents in units of marked subtitle contents according to defined subjects, thus forming multiple content clips which have one or more subjects; and
marking the start time and the end time of each played content clip in the media according to the time information.

9. The method of claim 8, wherein the subtitle information is a file which provides text description for a dialog in each medium or for other voices or explanations, comprising: subtitle content information, time code information which indicates time of presence of a subtitle, and/or media ID information corresponding to a subtitle file.

10. The method of claim 8, wherein the method for marking the start time and end time of each played content clip in the media according to the time information comprises:
marking the start and end time information of each content clip according to time of the content clip subject appearing in the content clip.

11. The method of claim 10, wherein the method for marking the start and end time information of each content clip comprises:
dividing one content clip with multiple subjects whose time interval exceeds a time threshold into multiple content clips of a same subject, wherein the time threshold is preset or determined through an algorithm according to the media; and
determining a statement that appears first in each content clip as a start statement and determining another statement that disappears last in each content clip as an end statement, setting the start time of the start statement of the content clip to be the start time of the content clip played in the media, and setting the end time of the end statement to be the end time of the content clip.

12. The method of claim 8, further comprising:
recording the content clips marked through the terms defined in the ontology library.

* * * * *